(12) United States Patent  
Trentin et al.

(10) Patent No.: US 8,262,170 B2
(45) Date of Patent: Sep. 11, 2012

(54) MOTOR VEHICLE WHEEL STRUCTURE

(75) Inventors: Marcello Trentin, Orbassano (IT);
Davide Vigè, Orbassano (IT); Benedetta Peyron, Orbassano (IT); Giovanni Boreanaz, Orbassano (IT); Giovanni Monfrino, Orbassano (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 176 days.

(21) Appl. No.: 12/547,956

(22) Filed: Aug. 26, 2009

(65) Prior Publication Data

US 2010/0127558 A1    May 27, 2010

(30) Foreign Application Priority Data

Nov. 24, 2008   (EP) .................................... 08425746

(51) Int. Cl.
*B60B 3/10*   (2006.01)
(52) U.S. Cl. .............................. 301/63.103; 301/64.101
(58) Field of Classification Search ............ 301/63.101, 301/63.103, 63.108, 64.101; D12/204, 209
See application file for complete search history.

(56) References Cited

U.S. PATENT DOCUMENTS

| D239,267 S | * | 3/1976 | Harty, Jr. ..................... D12/209 |
| D505,903 S | * | 6/2005 | Nordmann ................... D12/209 |
| 7,018,000 B2 | * | 3/2006 | Alff et al. ................. 301/63.107 |
| 7,104,611 B2 | * | 9/2006 | Alff et al. ................. 301/63.107 |
| D573,079 S | * | 7/2008 | Huet ............................ D12/209 |
| D581,339 S | * | 11/2008 | Schweizer .................. D12/209 |
| 2004/0227392 A1 | | 11/2004 | Coleman et al. |

FOREIGN PATENT DOCUMENTS

| DE | 32 17 457 | 11/1983 |
| DE | 10 2005 060 808 | 6/2007 |
| WO | WO 03/043836 | 5/2003 |

OTHER PUBLICATIONS

European Search Report for EP Application No. 08425746, dated Apr. 3, 2009.

* cited by examiner

*Primary Examiner* — Kip T Kotter
(74) *Attorney, Agent, or Firm* — Nixon & Vanderhye P.C.

(57) ABSTRACT

A motor-vehicle wheel structure comprises a wheel rim and a wheel disk having a circumferential border bent and welded within the wheel rim, and a central portion bearing a circumferential series of holes for engagement of bolts for fixing the wheel to the wheel support. The central portion is radiused to the circumferential border of the disk by means of an intermediate annular portion having in cross section an arched configuration projecting outwards. The intermediate annular portion has a plurality of embossed portions projecting outwards, configured in such a way as to define a plurality of spokes set at the same angular distance apart from one another.

6 Claims, 7 Drawing Sheets

MOTOR VEHICLE WHEEL STRUCTURE

BACKGROUND OF THE INVENTION

The present invention relates to metal structures of motor-vehicle wheels, of the type comprising a wheel rim and a wheel disk having a circumferential border bent and welded within the rim, the disk moreover having a central portion with a circumferential series of holes for engagement of bolts for fixing the wheel to a wheel support, said central portion of the wheel disk being radiused with the aforesaid outer circumferential border by an intermediate annular portion of the wheel disk having in cross section an arched conformation, projecting outwards.

The problem underlying the present invention is that of providing a wheel structure that will be able to reduce to the minimum the deformations and vibrations to which the wheel is subject as it rolls on the ground, with consequent reduction of the level of noise that is perceived inside the passenger compartment of a motor vehicle.

Studies and tests conducted by the present applicant have shown that an increase in the static and dynamic stiffness of the structure of the wheel can contribute considerably to the acoustic comfort inside the passenger compartment of the motor vehicle. From this standpoint, wheels made of light alloy in general enable an excellent result to be obtained since they are considerably stiffer than wheels made of steel plate, but present the drawback of having a relatively high cost.

SUMMARY OF THE INVENTION

The object of the present invention is to provide a wheel structure having improved characteristics from the standpoint of static and dynamic stiffness, which will, for example, enable production of a wheel made of steel plate with characteristics of stiffness similar to those of a conventional wheel made of light alloy, or else again that will enable production of a wheel made of light alloy with characteristics of stiffness even superior to those of wheels made of light alloy of a conventional type.

In general, the object of the invention is to provide a wheel characterized by a high static and dynamic stiffness and such as to reduce to the minimum the noise due to the deformations and vibrations resulting from rolling on the ground, as the motor vehicle is travelling.

A further purpose of the invention is to achieve the aforesaid target with a relatively simple and inexpensive structure.

With a view to achieving the above purposes, the subject of the invention is a motor-vehicle wheel structure having all the characteristics that have been referred to at the start of the present description and being moreover characterized in that:
said intermediate annular portion of the disk has a plurality of embossed portions, projecting outwards, configured in such a way as to define a plurality of spokes set at the same angular distance apart from one another;
each of said spokes has, in front view, substantially the shape of an isosceles triangle, with the base set outwards and the vertex facing inwards;
the median radial planes of said spokes coincide with the positions of said holes for the fixing bolts; and
in the spaces comprised between one spoke and another, said intermediate portion has a plurality of circumferentially elongated openings.

Further preferred characteristics of the wheel structure according to the invention are defined in the annexed claims.

In a preferred embodiment, the rim and the disk are made of steel plate. The wheel structure thus obtained, albeit made of steel plate, presents characteristics of stiffness that are comparable to those of a conventional wheel made of light alloy. The application of the invention to a structure made of light alloy is not in any case excluded.

Tests conducted by the present applicant have shown that the wheel structure thus made enables a considerable increase in the static and dynamic stiffness of the wheel to be obtained and a consequent considerable reduction of the noise in the passenger compartment of the motor vehicle when the latter is travelling.

BRIEF DESCRIPTION OF THE DRAWINGS

Further characteristics and advantages of the invention will emerge from the ensuing description with reference to the annexed drawings, which are provided purely by way of non-limiting example and in which.

DETAILED DESCRIPTION OF THE INVENTION

With reference to the drawings, number 1 designates as a whole a wheel structure comprising a wheel rim 2 made of stamped steel plate and a wheel disk 3.

Figure 3:
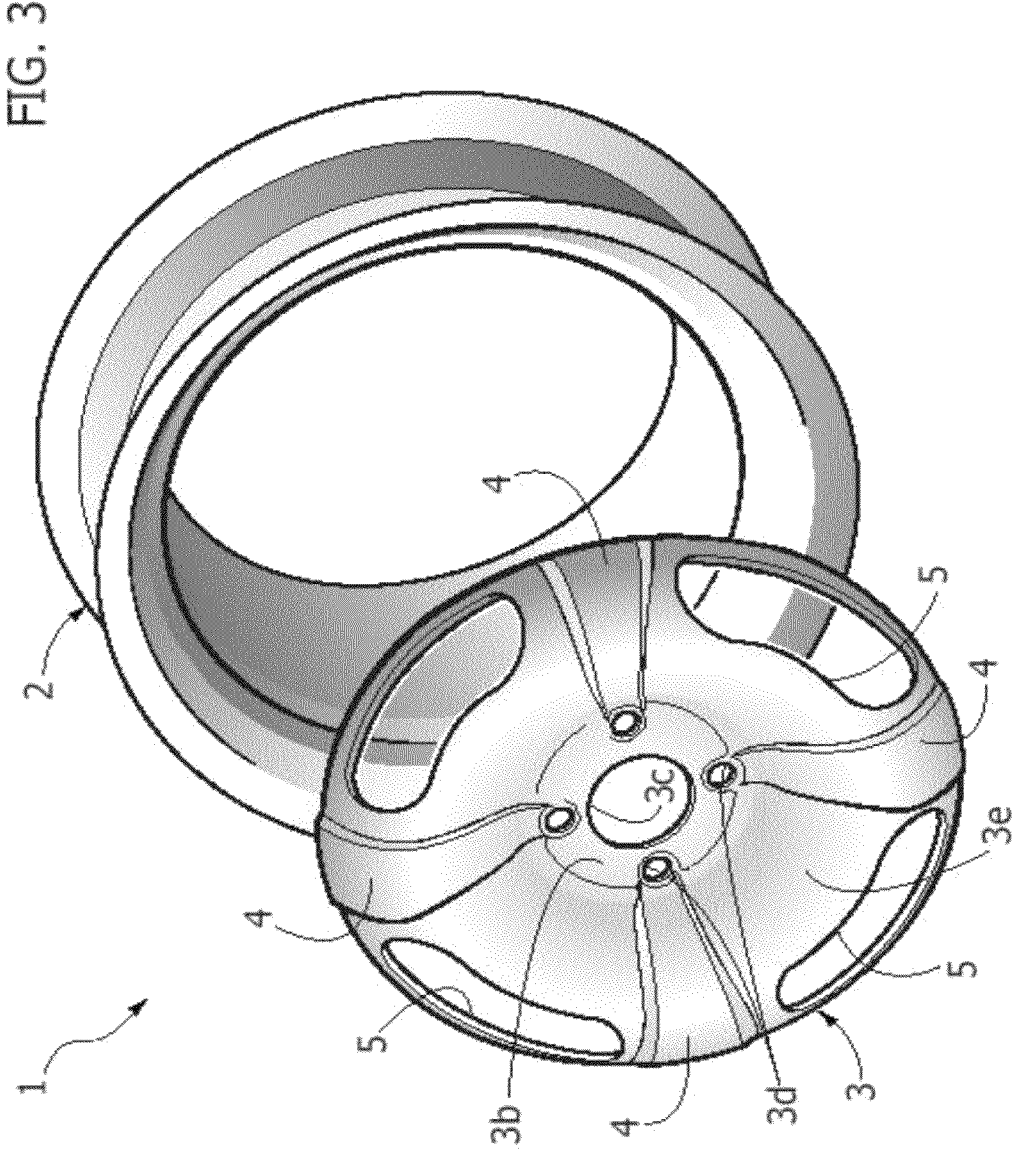
FIG. 3 is an exploded perspective view of the wheel structure according to the invention.

The disk 3 has an outer circumferential border 3a (FIG. 3) bent so as to define an intermediate cylindrical wall 2a of the rim 2.

The wheel disk 3 moreover presents a central portion 3b having a central hub 3c for mounting on the corresponding part of a wheel support, and a plurality of holes 3d for engagement of bolts for fixing the wheel to the wheel support. The central portion 3b of the disk 3 is radiused with the outer circumferential border 3a by means of an intermediate annular portion 3e, which has, in cross section, an arched profile projecting outwards so as to have its apex substantially tangential to the outer end plane of the wheel rim 2.

Figure 1:
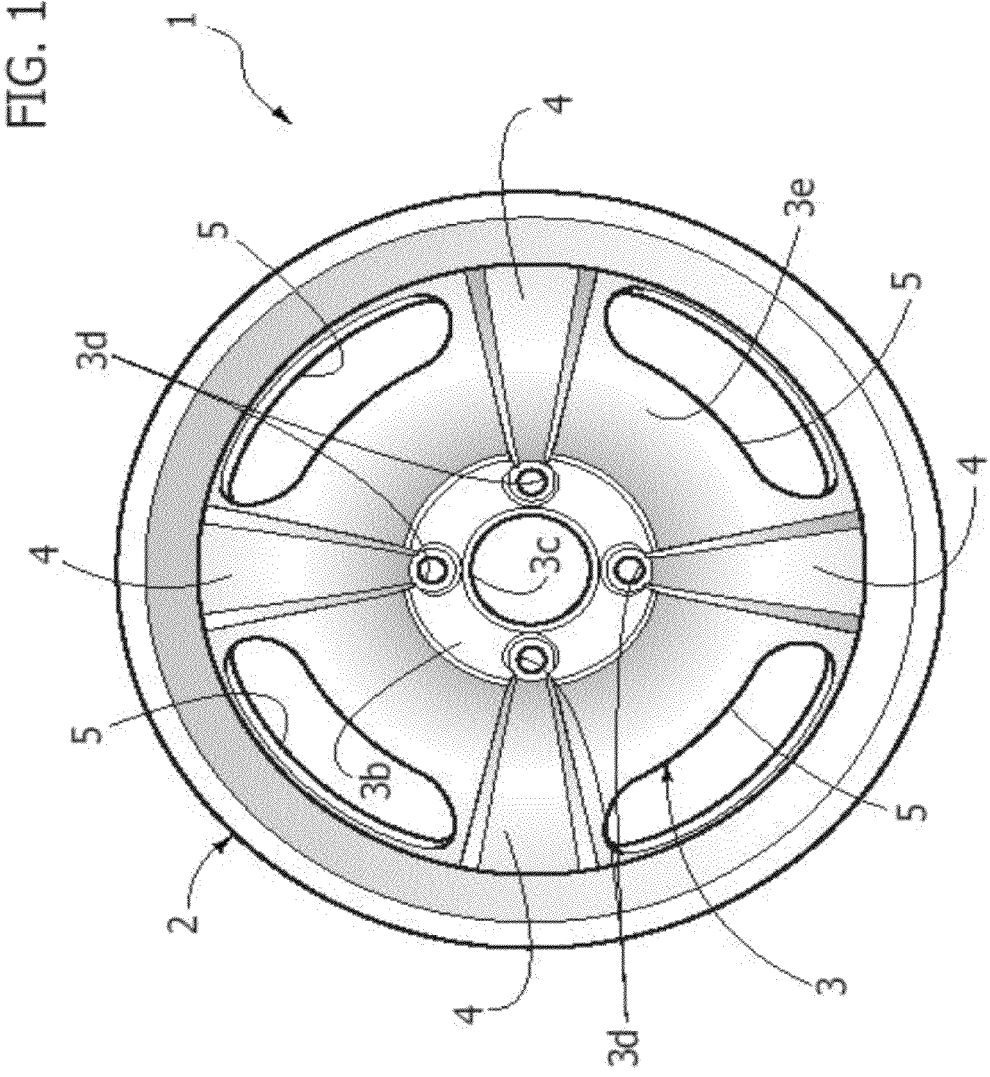
FIG. 1 is a front view of a preferred embodiment of a wheel structure according to the invention, where said structure is made of steel plate.
Figure 2:
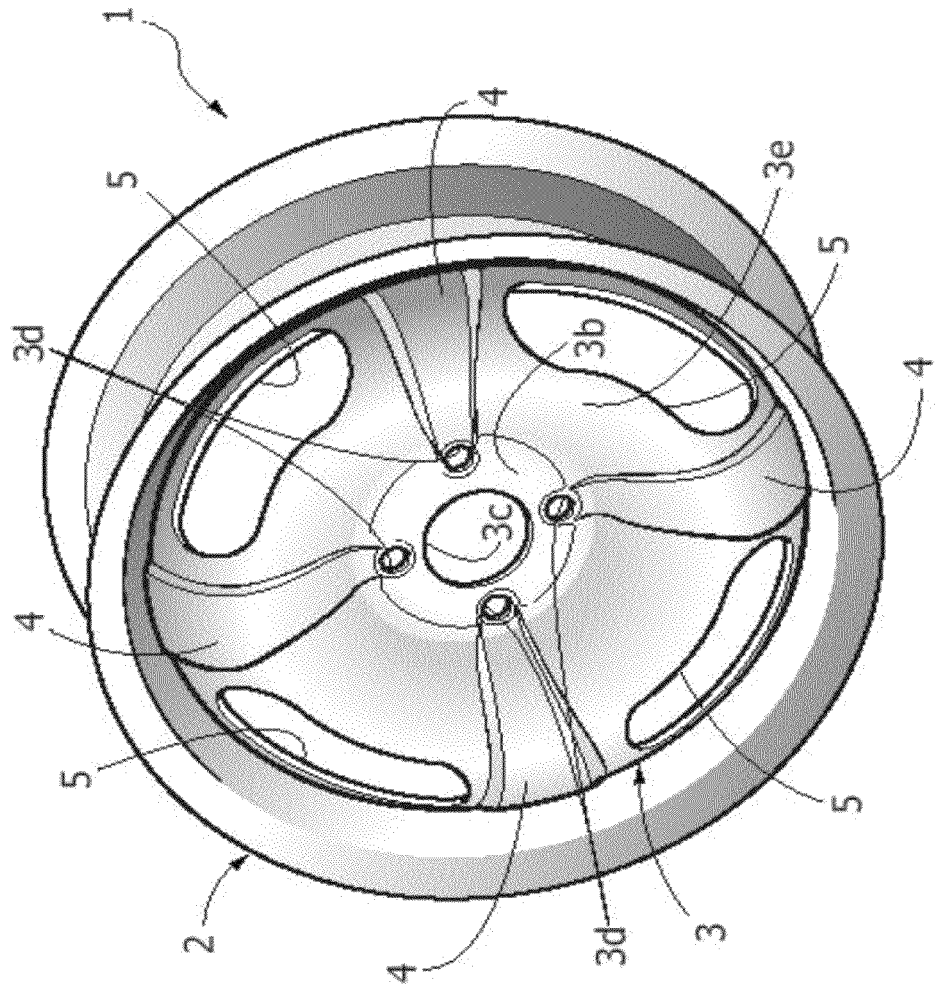
FIG. 2 is a perspective view of the wheel structure of FIG. 1.
Figure 7:
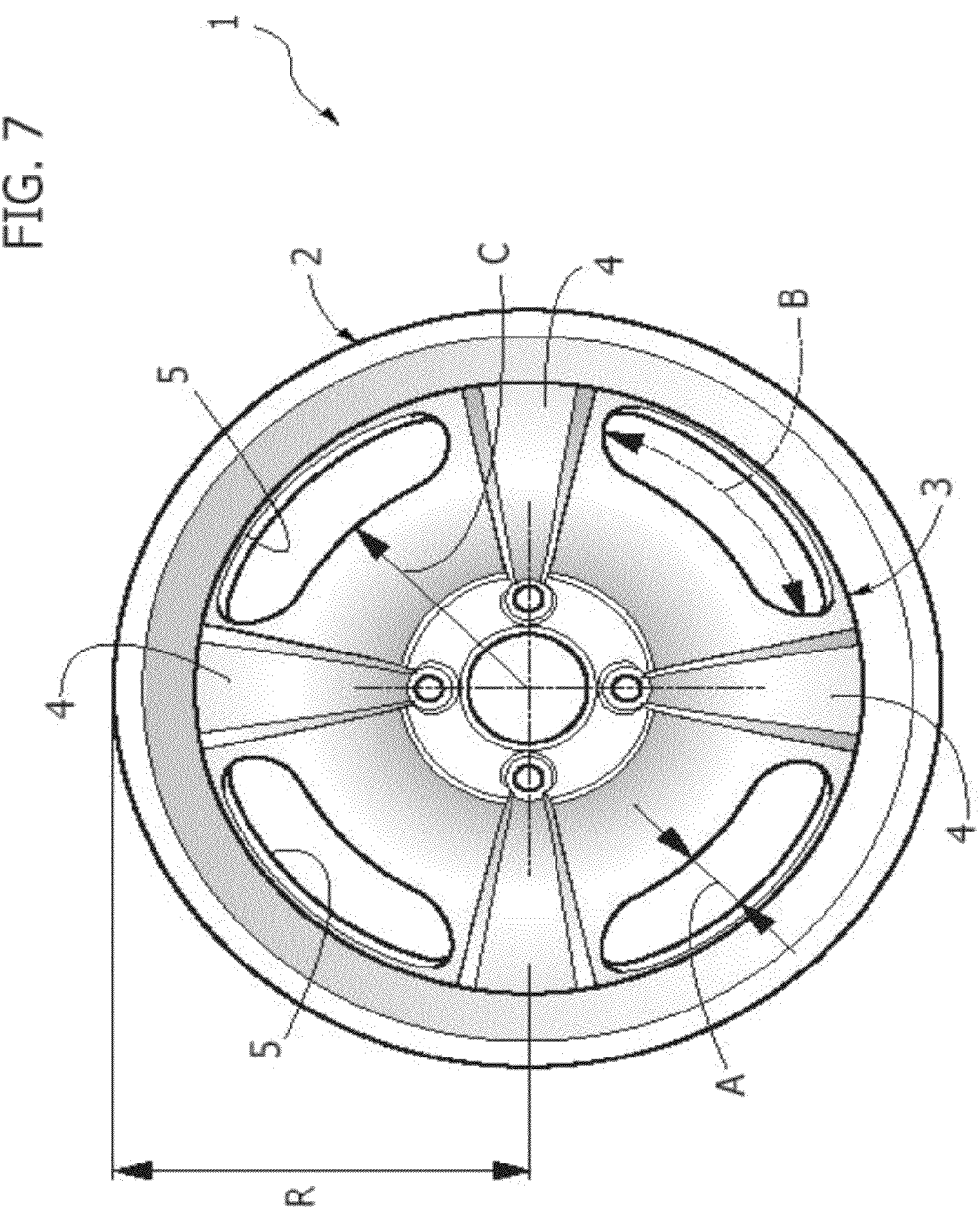
FIG. 7 is a further front view of the wheel structure of the invention.

According to the invention, the intermediate annular portion 3e of the disk made of steel plate has a plurality of embossed portions 4, projecting outwards, configured in such a way as to define a plurality of spokes set at the same angular distance apart from one another. Each of said spokes 4 has in front view (FIGS. 1, 7) substantially the shape of an isosceles triangle, with the base set outwards and the vertex facing inwards. The median radial planes of said spokes coincide with the positions of said holes 3d for the fixing bolts. In particular, at the radially internal end of each spoke 4 the sides of the spoke are tangential on opposite sides to the respective hole 3d for the fixing bolt.

In the spaces comprised between one spoke 4 and another, said intermediate portion 3e has a plurality of circumferentially elongated openings 5. In the example illustrated, said openings are shaped with their longer edges set on two circumferences concentric with the wheel. The ends of each opening terminate at a distance from the respective spokes 4 so that between one opening 5 and another the residual portions of the disk 3 also define sorts of spokes, each of which has, at the centre, the embossed portion 4.

Tests conducted by the present applicant have shown that the conformation and sizing of the spokes 4 and of the openings 5 are critical for the purposes of achieving the pre-set result. In particular, it is advantageous for the angle of inclination of the sides of the spokes to be comprised between 15° and 20°, and preferably 17.6°. Furthermore, the aforesaid openings 5 made in the intermediate annular portion of the wheel disk preferably occupy a percentage of approximately 20% of the total front area of said wheel disk. Furthermore, the openings 5 preferably have (see FIG. 7) a radial dimension A equal to approximately 20-25% of the maximum radius R of the wheel rim, and a length B in a circumferential direction equal to approximately 70-75% of the maximum radius of the wheel rim, said openings having a radially internal edge that is positioned at a distance C from the centre] equal to approximately 40-45% of the maximum radius of the wheel rim.

Figure 5:
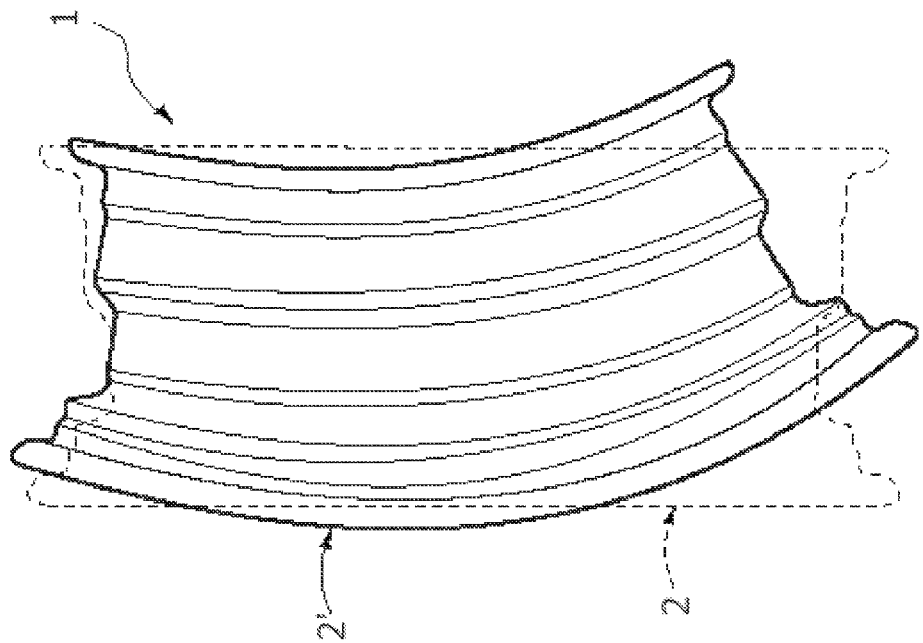
FIGS. 4, 5 and 6 are, respectively, a cross-sectional view, a side view, and a perspective view that show the deformations to which the wheel structure according to the invention is subject as it rolls along the ground, said deformations being exaggerated for reasons of clarity.
Figure 4:
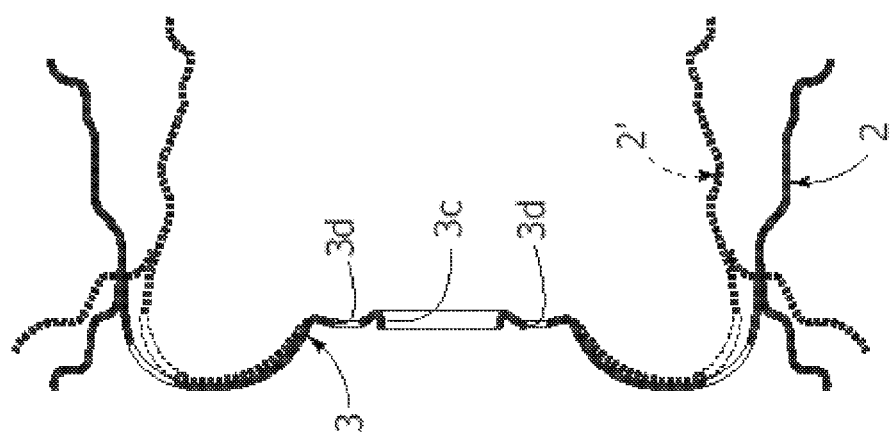
Figure 6:
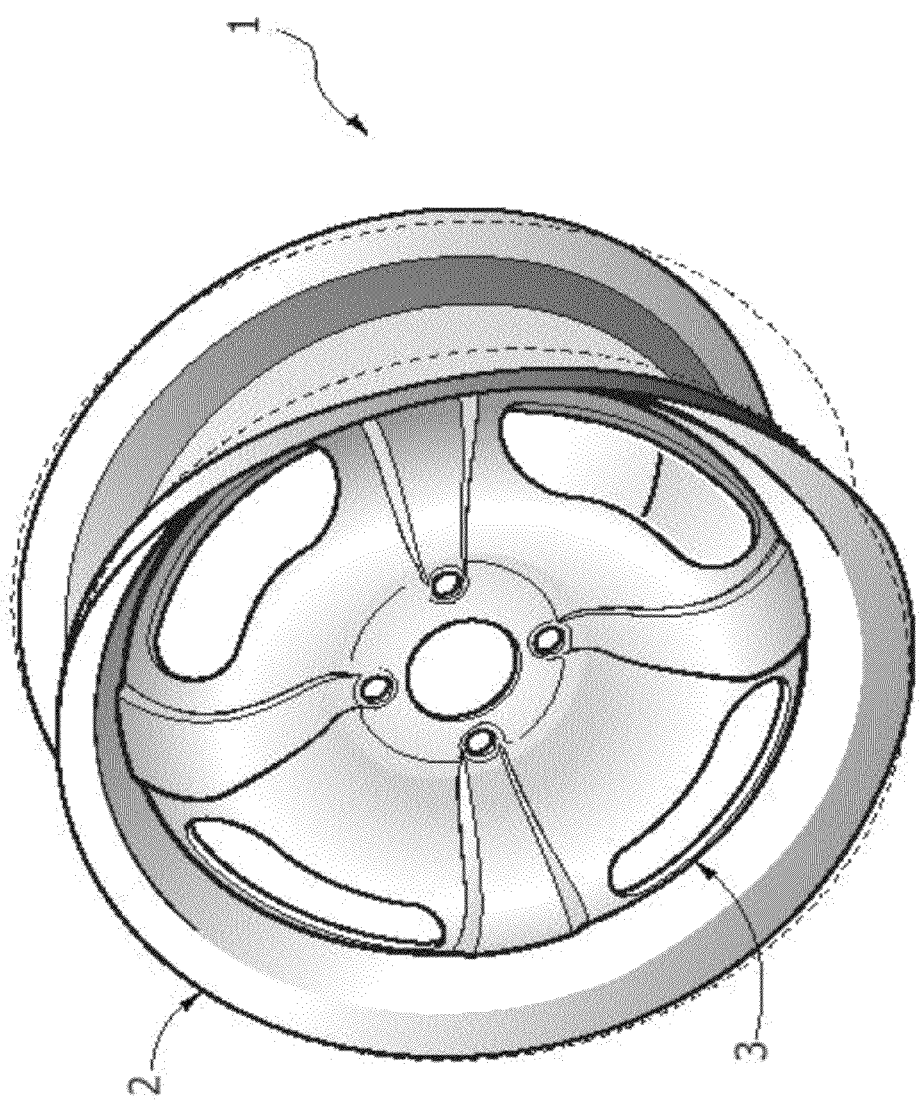

FIGS. 4, 5, and 6 of the annexed drawings show, exaggerated for reasons of clarity, the deformations 2' to which the wheel structure according to the invention is subject during use. The studies and tests conducted by the present applicant have shown that said deformations are considerably smaller than those to which a wheel structure made of conventional steel is subject and that they are substantially similar or in any case close to those to which a wheel structure without the disk 3 but made of light alloy would be subject.

Figure 8:
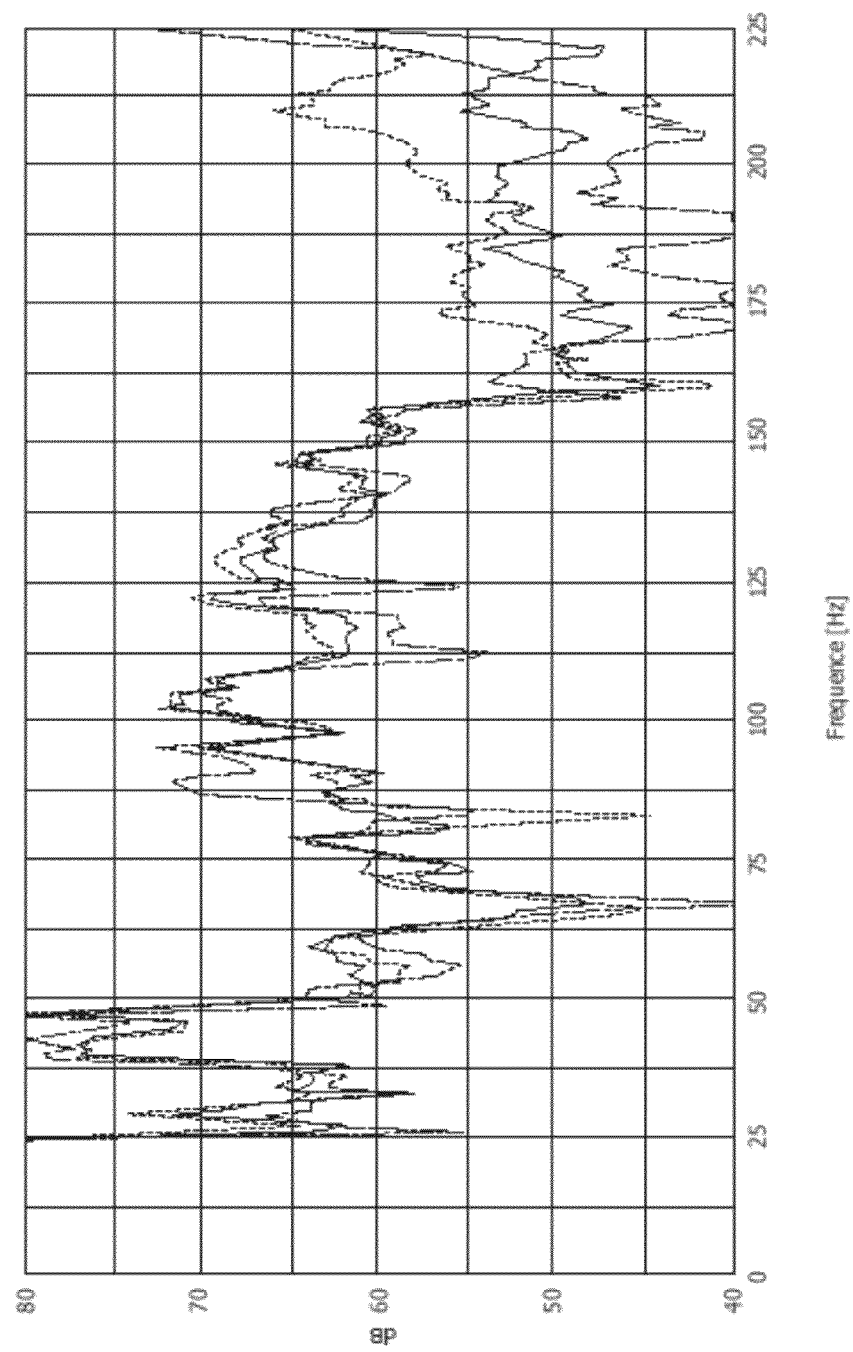
FIG. 8 is a diagram that enables a comparison of the characteristics of noise of the wheel structure according to the invention with a wheel structure made of steel of the conventional type, and with a wheel structure made of light alloy.

Said result has been highlighted in the diagram of FIG. 8, obtained by measuring the noise in the passenger compartment of the motor vehicle when the latter is travelling. The diagram shows the variation of the noise at the different frequencies for a wheel according to the invention made of steel (solid line) and for a wheel according the prior art and also made of steel (dashed line). The diagram brings out clearly the considerable noise reduction that can be obtained, in a wheel made of steel, thanks to the adoption of the characteristics that form the subject of the present invention, particularly in a high frequency ranges. The diagram also shows the noise produced by a wheel according to the invention and made of light alloy, the further advantage in terms of noise reduction at high frequencies being clearly apparent.

Of course, without prejudice to the principle of the invention, the details of construction and the embodiments may vary widely with respect to what is described and illustrated herein purely by way of example, without thereby departing from the scope of the present invention.

In particular, even though the invention has been illustrated with reference to an embodiment that envisages that the structure of the wheel is made of steel plate, by no means ruled out is the possibility of re-applying the concepts of the invention also to a wheel made of light alloy in order to increase the stiffness thereof with respect to the traditional configuration.

The invention claimed is:

1. A motor-vehicle wheel structure, comprising a wheel rim and a wheel disk having a circumferential border bent and welded within the rim, said disk having a central portion with a circumferential series of holes for engagement of bolts for fixing the wheel to a wheel support, said central portion of the wheel disk being radiused to the aforesaid outer circumferential border by an intermediate annular portion of the wheel disk having a radial cross section with an arched conformation projecting axially outwards, and wherein:

said intermediate annular portion of the disk defines a rounded base surface, having an arched conformation, said intermediate annular portion of the disk has a plurality of embossed portions, projecting axially outwards relative to said rounded base surface, said embossed portions being configured in such a way as to define a plurality of spokes set at the same angular distance apart from one another;

each of said spokes has in front view substantially the shape of an isosceles triangle, with the base set radially outwards and the vertex facing radially inwards, each spoke having two radial side surfaces projecting axially outwards relative to said rounded base surface of the wheel intermediate portion, and an axially outwardly facing front wall which defines an axially outwardly raised surface relative to said rounded base surface of the wheel intermediate portion, with the radial cross-section of said raised surface of each spoke having a shape corresponding to the radial cross-section of said rounded base surface of the intermediate wheel portion;

the median radial planes of said spokes coincide with the positions of said holes for the fixing bolts; and in the spaces comprised between one spoke and another, said intermediate portion has a plurality of circumferentially elongated openings.

2. The wheel structure according to claim 1, wherein the angle of inclination of the radial sides of the spokes is comprised between 15° and 20°.

3. The wheel structure according to claim 1, wherein the aforesaid elongated openings obtained in the intermediate annular portion of the wheel disk occupy approximately 20% of the total front area of said wheel disk.

4. The wheel structure according to claim 3, wherein the aforesaid elongated openings have a radial dimension equal to approximately 20-25% of the maximum radius of the wheel rim, a length in a circumferential direction equal to approximately 70-75% of the maximum radius of the wheel rim, said openings having a radially internal edge that is positioned at a distance from the wheel central axis equal to approximately 40-45% of the maximum radius of the rim.

5. The wheel structure according to claim 1, wherein, at the vertex of each spoke, the radial sides of the spoke are tangential on opposite sides to the respective hole for the fixing bolt.

6. The wheel structure according to claim 1, wherein the rim and the disk are made of steel plate.

* * * * *